May 31, 1955  E. E. GOLDSMITH  2,709,301
DENTURES AND ARTIFICIAL TEETH
Filed July 31, 1952  2 Sheets-Sheet 2
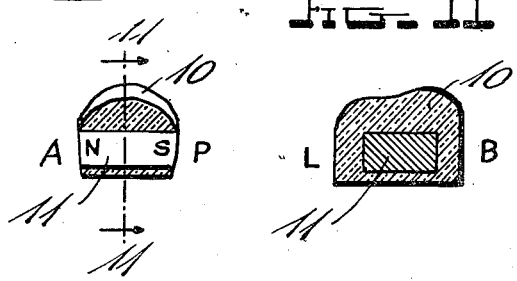
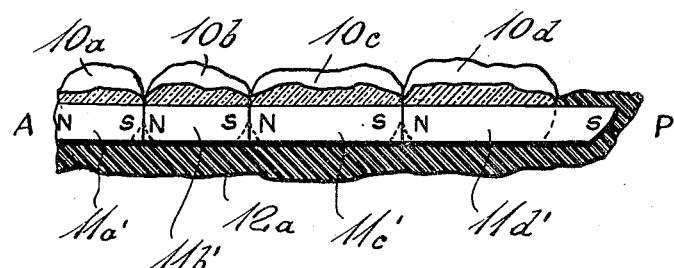
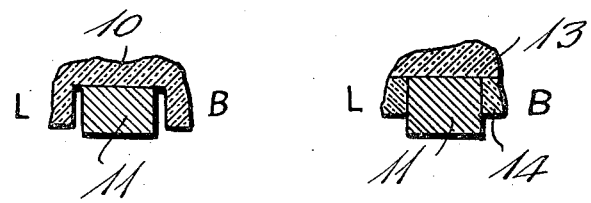
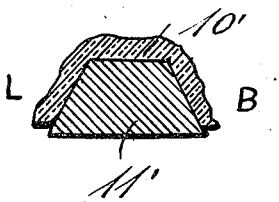
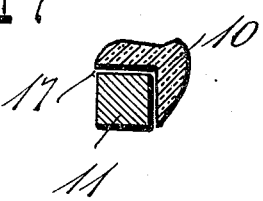
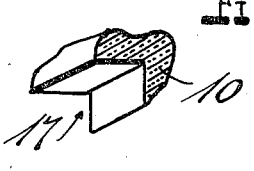
INVENTOR
Ernest Emil Goldsmith,
BY John B. Brady
ATTORNEY

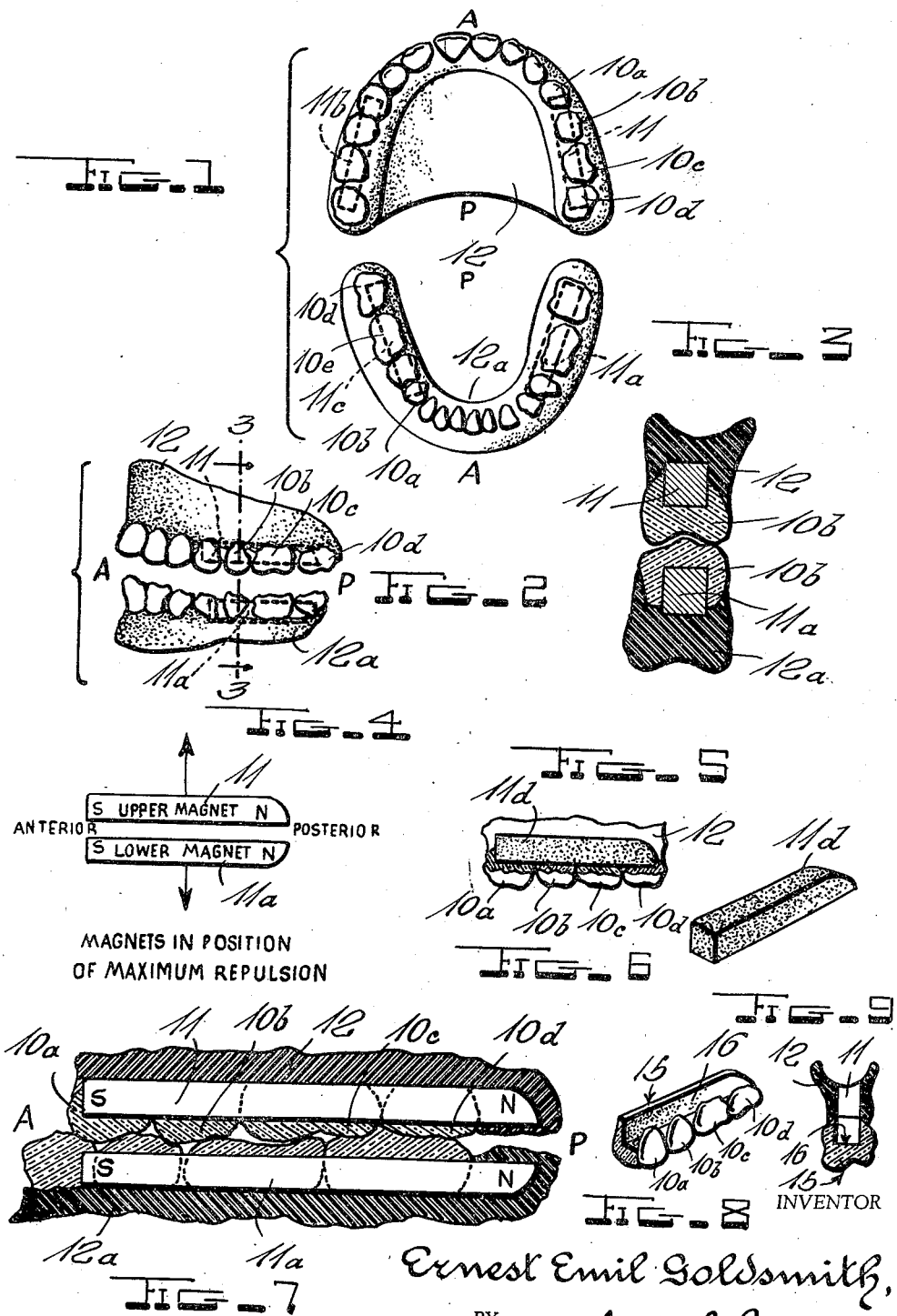

United States Patent Office 2,709,301
Patented May 31, 1955

2,709,301

DENTURES AND ARTIFICIAL TEETH

Ernest Emil Goldsmith, Montreal, Quebec, Canada

Application July 31, 1952, Serial No. 301,873

21 Claims. (Cl. 32—2)

My invention relates to artificial teeth and to dentures embodying such teeth.

This application is a continuation-in-part of my application Serial No. 88,146, filed April 18, 1949, for Dentures and Artificial Teeth.

The object of my invention is to provide a novel arrangement of permanent magnets for artificial teeth and dentures for improving convenience and efficiency in the manufacture and use thereof.

Another object of my invention is to provide an arrangement of permanent magnetic material for application to groups of teeth in dentures for increasing the stabilizing pressure of dentures on the gum ridges for maintaining the dentures in position.

A still further object of my invention is to provide novel constructions of artificial teeth and associated magnetic material wherein the teeth may have a variety of structural sections facilitating the installation of the teeth or groups of teeth with respect to the dentures.

Still another object of my invention is to provide an artificial tooth structure for accommodating a magnet as wide as possible in the direction from lingual to buccal side.

Still another object of my invention is to provide a structure for an artificial tooth having magnetic material associated therewith where the magnetic material is coated adjacent the contact thereof with the tooth for preventing the magnetic material from imparting a grey appearance to the tooth.

Still another object of my invention is to provide a structure of artificial tooth and associated magnetic material in which the biting surface of the tooth is formed from hard material, such as porcelain, while the sides of the tooth are formed from softer material, such as acrylic resin.

Still another object of my invention is to provide a structure of artificial tooth or group of teeth having a substantially L-shaped recess in the rear thereof to facilitate the fitting of the tooth or group of teeth against a bar magnet.

Still another object of my invention is to provide a construction of dentures employing coacting bar magnets coextensive with a multiplicity of teeth at each side of the dentures and arranged to exert repelling forces or directive thrusts with respect to each other for facilitating the retention of the dentures in the mouth of the wearer.

Other and further objects of my invention reside in the improved mounting for magnetic material within the artificial tooth or groups of artificial teeth or dentures as set forth more fully in the specification hereinafter following by reference to the accompanying drawings, in which:

Figure 1 is a plan view showing upper and lower dentures equipped with magnetic material arranged in accordance with my invention; Fig. 2 is a side elevational view of the dentures illustrated in Fig. 1 and schematically illustrating the arrangement of the coacting magnetic material therein; Fig. 3 is a vertical sectional view on an enlarged scale taken substantially on line 3—3 of Fig. 2; Fig. 4 is a theoretical view illustrating the arrangement of bar magnets in the dentures in accordance with my invention; Fig. 5 is a schematic sectional view showing the association of permanent magnet material in powder form installed in a group of teeth in accordance with my inention; Fig. 6 is a perspective view of the permanent magnet material distributed in powder form through a wax base which is insertable into the recess formed in the artificial teeth; Fig. 7 is a sectional view showing the arrangement of the coacting permanent magnet material in the upper and lower dentures; Fig. 8 is a perspective view of a group of teeth recessed to receive the permanent magnet material; Fig. 9 is a composite top plan view and transverse section taken through a group of teeth tilted upwardly and showing the permanent magnet material associated therewith, the magnet material being shown in end view and top perspective view; Fig. 10 is a longitudinal sectional view through an artificial tooth showing the permanent magnet material associated therewith in accordance with my invention; Fig. 11 is a cross sectional view taken through the tooth of Fig. 10 on line 11—11 thereof; Fig. 12 shows a modified form of permanent magnet installation in a tooth in accordance with my invention; Fig. 13 is a longitudinal sectional view showing a number of teeth similar to that disclosed in Figs. 10 and 11 assembled upon a supporting structure or plate; Fig. 14 is a cross sectional view showing one manner of installing the permanent magnet material within a slotted recess in the tooth; Fig. 15 shows the manner of associating the permanent magnet material with an artificial tooth of composite construction having a hard biting surface and a softer side structure; Fig. 16 illustrates the manner in which the structure of the artificial tooth may be accommodated for receiving a magnet of trapezoidal cross section; Fig. 17 illustrates the manner of recessing an artificial tooth or group of teeth to provide an L-shaped recess to facilitate the application of the tooth or group of teeth to the sides of a bar magnet; and Fig. 18 is a perspective view illustrating more clearly the manner of recessing a tooth in an L-shaped section.

The main function of magnetic dentures is to supply increased stabilizing pressure of dentures on the gum ridges; this is of particular value to patients whose gum ridges are not sufficiently defined, through excessive absorption of gum tissue, or for other reasons, to give adequate natural retention of their artificial dentures.

This additional pressure, which has a stabilizing action, keeping the dentures in their true position in the mouth, is supplied by including in the structure of the dentures, a system of four bar magnets of a particular type. The magnets are located in the posterior teeth so that the two magnets in the upper set of dentures, lying immediately opposite the opposing magnets in the lower dentures, exert a force of repulsion which tends to separate the upper and lower dentures, as though they were held by an invisible spring.

The teeth are manufactured so as to provide a recess in the posterior teeth in which the magnets are located in their correct positions, so that the dentures will automatically exert their maximum stabilizing forces. The anterior teeth are of conventional shape, and are non-magnetic. The posterior teeth are supplied in two distinct types, namely, single teeth, and grouped teeth. In general, grouped or block-teeth will ensure the most satisfactory arrangement of the magnetic forces, since they are correctly pre-articulated, and can be set up more easily and more accurately than the separate single teeth. Unusual cases, however, will require treatment of the latter type, and for this purpose a separate technique has been included which is slightly more complicated than the technique for grouped teeth, but, nevertheless, well within the scope of the dental mechanic of average ability, and experience with normal dentures.

Four bar magnets of extremely high power are provided with each combination set of magnetic teeth. These are constructed from a complex metallic alloy, and are ground to accurate dimensions before dispatch, and fully magnetized. The four magnets are matched for dimensions and magnetic flux density. The polarity of the magnets is easily recognized by the shape of the end, and it is important to note that the tapered end of every magnet should always lie in the posterior direction. This applies equally to upper and lower denture and to right and left sides of the case. The length of each magnet is sufficient to span comfortably two molars and two premolars and the tapered end is designed to conform with the usual condyle curvature.

Correct placing of the magnets in the boiled-out case is of the utmost importance. Each magnet is laid flat on the ledge presented by the four recessed posterior teeth, with the flatter side down, so that the upper and lower opposing magnets, in the fully articulated position of the dentures, are directly opposite and not displaced in the vertical sense.

Referring to the drawings in detail, the letters A and P represent the anterior and posterior ends, respectively, of the dentures and the letters L and B represent the lingual and buccal sides, respectively. In Fig. 1 I have shown the upper and lower dentures in plan view, the upper denture being shown at 12 and the coacting lower denture at 12a. The groupd teeth in each of the dentures, that is, the molars, and premolars have permanent magnet material extending therethrough as represented at 11, 11a, 11b and 11c. The anterior ends of the permanent magnets are aligned one over the other, while the posterior ends of the permanent magnets are rounded and related to each other as represented in Fig. 2 for producing a thrust force as part of the repelling force for maintaining the dentures in position.

The powerful magnetic opposition which is established between the permanent magnets 11, 11a and 11b, 11c, is due to the polarization of the permanent magnets as represented in Fig. 7 where the anterior poles are designated S for "South" and the posterior poles are designated N for "North." The premolars are designated at 10a and 10b and the molars are designated at 10c and 10d, Figs. 1 and 7, with the single permanent magnet 11 extending therethrough. Fig. 7 is a fragmentary enlarged sectional view of the set of dentures shown in side elevation in Fig. 2. The permanent magnet material 11, 11a, 11b and 11c may be formed from permanent magnet material in powder form packed in the tooth channels and/or the powder can be mixed with the plastic material of the base plate and/or the tooth.

In Fig. 5 I have shown the permanent magnet material suspended in a plastic base represented at 11d and extended through the group of teeth, represented at 10a, 10b, 10c and 10d. In Fig. 6 the mass of permanent magnet powder is shown ready for insertion into the back of a group of teeth shown at 10a, 10b, 10c and 10d.

In Figs. 10 and 11 I have shown an artificial tooth 10, which may be of acrylic resin or porcelain for example, having a permanent magnet 11 (or permanently-magnetizable material to be magnetized later) traversing the tooth in an anterior-posterior direction. It will be noted that the magnet is wholly surrounded by tooth material excepting on the anterior and posterior surfaces where, when assembled into a denture, it is alongside of another tooth. The magnet is magnetized in the direction AP as indicated by the letters N and S and is preferably of anisotropic material. If preferred the magnet 11 may project slightly on each side of the tooth as shown in Fig. 12.

In Fig. 13 I have shown a number of artificial teeth 10a, 10b, 10c and 10d having the chain magnets 11a', 11b', 11c' and 11d' respectively magnetized in the same direction, passing transversely through them, the adjacent magnet faces being in good contact with one another. The magnets are thus in the form of a chain and constitute together effectively a single magnet. The teeth are molded into a support, plate, or denture 12, and it is preferably arranged that the plate material encloses the junction between adjacent teeth in such a manner that the magnets are wholly enclosed by the teeth and the plate material and so protected from acids in the mouth and from risk of contact with other magnets or magnetic material, which contact might cause some degree of demagnetization. As shown in Fig. 13, the under surfaces of the magnets are not enveloped by the tooth material as shown in Figs. 10 to 12, but are protected by the material of the plate.

Where necessary the adjacent magnet surfaces may be made other than perpendicular to the axes of the magnets in order to secure good contact between these surfaces.

It is usually convenient to provide each artificial tooth with a separate magnet as described since such teeth can be supplied to a dental mechanic for assembly into dentures and the mechanic can treat such teeth in the same manner as normal artificial teeth, excepting that he should take care to locate adjacent magnet surfaces in good contact with one another. Fillets of magnetic material, of wedge or other shape, may, if necessary, be inserted between adjacent magnet faces to ensure good magnetic contact.

As shown in Fig. 7, however, the chain of magnets 11a, 11b, 11c, 11d of Fig. 13 may be replaced by a single magnet 11 extending through the premolars 10a and 10b and the molars 10c and 10d.

In Fig. 7 is shown a part of a set of upper and lower dentures in approximately their normal relation when in the mouth. It will be noted that in Fig. 13 the magnets are arranged to protrude in a posterior direction some distance beyond the posterior molar 10d, the protruding ends being completely enclosed in the material of the plate 12.

Magnetization should preferably be carried out either in the waxed stage of the preparation of the denture or after completion of the manufacture of the denture. It is preferred to provide either only the molars or the molars and the premolars with permanently magnetizable bodies as described; magnetization is then preferably effected in an anterior-posterior direction, so that anterior zones of the aggregation in both dentures have one polarity, say North, the posterior zones of the magnets in both dentures another polarity, say South. If desired, other artificial teeth, such as canines and incisors, may also be provided with magnets, or where single magnets are used instead of a chain of magnets, the single magnets may be suitably curved to extend through the desired teeth. Magnetization is then carried out longitudinally of the magnet or chain of magnets and thus in a curve following approximately the line of the ridges in the mouth on which the dentures are seated.

The permanently magnetizable bodies may be immovably fixed in the tooth material or they may be loose in their spaces in the teeth so as to enable them to move into close contact with each other and into good register with those of the neighboring teeth in the same denture under the influence of the forces of magnetization. This is illustrated in Fig. 14 and a similar loose arrangement of the magnet may be used when the tooth material completely surrounds the sides of the magnet as shown in Figs. 10 to 12.

One advantage of the arrangements according to the invention over known arrangements is the possibility of using magnet structures having a large ratio of length to cross-section, and therefore structures which can operate at high efficiency in repulsion, and at the same time bringing the magnets in the upper and lower dentures which repel one another much closer together than is the case with known arrangements. The magnetic forces for a given weight of magnetic material are therefore considerably greater than with known arrangements. It is desirable that the magnets should be situated as close as is reasonably practical to the biting surfaces of the teeth.

The permanently magnetizable material 11 is preferably a high coercive, high remanent density material of large energy content $(BH)_{max}$ such as a material containing 33% iron, 6% aluminum, 18% nickel, 35% cobalt and 8% titanium. The polar zones of the bars or in the chain of magnets may be made of a different magnetic material from that of the neutral zone. The polar zones may be made of high-coercive force material while the neutral zone may be made of high remanent flux density material containing 51% iron, 8% aluminum, 14% nickel, 24% cobalt and 3% copper. The effect is an increased yield of external magnetic energy from a given volume of material.

In all magnetic dentures, good register of the magnets in the lower denture with respect to those of the upper denture is desirable and particularly equal overall length of opposing bars or chains. It is, however, sometimes desired to effect a thrust on the lower denture in a posterior direction. This can be done by mounting the bars or the chains in the upper denture slightly displaced in an anterior direction with respect to the corresponding bars or chains of the lower denture, as indicated in Fig. 2.

The material of the teeth situated between permanent magnet and biting surface may be different from the material of the other regions of the teeth or molar blocks. It may be separately mounted after magnets and side portions of the teeth have been brought into position in the process of manufacture of the denture. This is illustrated in Fig. 15 where the part 13 of the tooth between the magnet 11 and the biting surface is of a hard material such as porcelain and the sides 14 are of softer material such as acrylic resin.

The cross section of the bars or of the magnets of the chain in a plane at right angles to the anterior-posterior direction may have any suitable shape. It may be square, rectangular, elliptic or circular or it may have an irregular shape to follow more or less the outline of the tooth. In Fig. 16 the magnet is of trapezoidal cross-section, and is designated 11'.

The length to cross-section ratio of the bar magnet or the chain of magnets should be such that (also allowing for the demagnetizing influence of the opposing magnet in the other denture), the material is utilized as closely as possible to its $(BH)_{max}$, the optimum working point. The ratio of the length of the magnet or chain to the equivalent diameter thereof (that is the diameter of a circle of the same area) should be of the order of 5 but there is an optimum value for each type of material.

The magnets are provided with a special coating, for example, of white paint, which prevents the magnets from making the teeth appear grey when viewed through the plastic of the teeth.

One of the commercial embodiments of my invention has been illustrated in Figs. 8 and 9, where a group of teeth are cast intervally in block form providing in the same assembly, constituted by the strip 15, the premolars 10a and 10b and the molars 10c and 10d. The channel or groove 16 formed in the strip of teeth is shaped to receive the permanent magnet material 11. It will be readily seen that these interval units of group teeth containing the permanent magnet material set therein may be very readily mounted in dentures and the permanent magnet material in the upper and lower dentures thus brought into coacting relation in a very simple manner for stabilizing the dentures and maintaining the dentures in the mouth of the wearer.

Fig. 9 is a composite top, end, and perspective view, a portion of the denture 12 and the permanent magnet material 11 being tilted upwardly for the purpose of more readily explaining the invention. The magnet material 11 is shown both in end view and in top view tilted upwardly toward the plane of the sheet of drawing.

One of the important forms of the tooth structure or construction of a group of teeth has been shown in Figs. 17 and 18, wherein the tooth 10 is shown recessed at 17 in substantially an L-shaped contour whereby the tooth or associated group of teeth may be readily assembled over the permanent magnet material designated at 11, in Fig. 17. The permanent magnet material 11 is entirely obscured by the biting surface and the buccal portion of the tooth which extend in directions lying in planes which are substantially normal to each other, forming a recessed corner into which the permanent magnet material is set. Under these conditions the permanent magnet material 11 serves both as a support for the tooth or group of teeth, and also as the activating means for the emanation of the repulsive forces which coact with the tooth or group of teeth situated above the tooth illustrated.

One of the distinctive advantages arising from my invention is the ability of assembling a substantially linear mass of permanent magnet material with respect to a tooth or group or teeth entirely eliminating the necessity of shaping magnets in a curve in an effort to conform the magnets to the dentures. It is realized that the preforming of bar magnets in curved shapes introduces a manufacturing problem tending to so increase the cost of the dentures as to render the use of magnets impracticable.

While I have described my invention in certain of its preferred embodiments I realize that further modifications may be made and I desire that it be understood that no limitations upon my invention are intended other than may be imposed by the scope of the appended claims.

What I claim as new and desire to secure by Letters Patent of the United States is as follows:

1. A denture comprising a plurality of artificial teeth each apertured in a direction generally parallel to the biting surface, supporting means for said teeth, and permanent magnet material traversing said apertures, the longitudinal axis of said magnet material extending in a substantially straight line between the extremities of said material.

2. A denture according to claim 1, wherein said denture comprises molars and premolars and wherein said permanently magnetizable material extends through said molars and premolars.

3. A denture according to claim 1, wherein said denture comprises molars, premolars and canines and wherein said permanently magnetizable material extends through said molars, premolars and canines.

4. A denture according to claim 1, wherein said permanently magnetizable material comprises a plurality of bars in end-to-end contact with one another.

5. A denture according to claim 1, wherein said permanently magnetizable material is magnetized in an anterior-posterior direction.

6. A set of dentures comprising upper and lower dentures, each such denture comprising a plurality of artificial teeth each apertured between the sides thereof in a direction generally parallel to its biting surface, supporting means for said teeth and substantially straight permanent magnets traversing said apertures, all said magnets being magnetized in an anterior-posterior direction with poles of like polarity at the anterior and posterior ends of the upper and lower dentures respectively.

7. An article of manufacture comprising artificial tooth structure including an artificial tooth possessing an opening in a direction generally parallel to its biting surface and which extends immediately below the biting surface and permanent magnet material disposed in the opening and with its longitudinal axis generally parallel to the biting surfaces of said teeth and having a surface extending between the extremities of said material substantially parallel to said longitudinal axis and spaced from the furthest point on said biting surfaces by less than the thickness of said magnet material in a direction perpendicular to the said longitudinal axis.

8. An article of manufacture as set forth in claim 7 in which said permanent magnet material projects outwardly beyond opposite sides of the tooth.

9. An article of manufacture comprising artificial tooth structure consisting of a plurality of artificial teeth, each having openings extending in a direction generally parallel to the biting surfaces thereof, and permanent magnet material disposed in said openings with its longitudinal axis generally parallel to the biting surfaces of said teeth and having a surface extending between the extremities of said material substantially parallel to said longitudinal axis and spaced from the furthest point on said biting surfaces by less than the thickness of said magnet material in a direction perpendicular to the said longitudinal axis.

10. A denture comprising a supporting structure, said structure carrying a plurality of adjacent artificial teeth each having an opening constituting a substantial portion of the cross section of the material of the tooth extending in a direction generally parallel to the biting surface thereof and permanent magnet material disposed in said openings and having a surface situated in proximity beneath the biting surfaces of all said teeth and providing a relatively large cross section of magnetic material as compared with the balance of the section of the artificial teeth.

11. A denture as set forth in claim 10 which comprises both molars and premolars and wherein said permanent magnet material extends through both said molars and premolars.

12. A denture as set forth in claim 10 which includes molars, premolars and canines and wherein said permanent magnet material extends through said molars, premolars and canines.

13. A denture as set forth in claim 10 wherein said permanent magnet material is magnetized in an anterior-posterior direction.

14. A denture as set forth in claim 10 in which said permanent magnet material is rounded on the extreme posterior end thereof on curves formed on centers located in positions adjacent to the biting surfaces.

15. A denture as set forth in claim 10 which includes a pair of coacting dentures and in which the lengths of the permanent magnet material in the coacting dentures is essentially the same.

16. A denture as set forth in claim 10 in which said permanent magnet material is provided with a coating for preventing the magnetic material from impairing the appearance of the artificial teeth.

17. A denture as set forth in claim 10 in which said permanent magnet material has a large ratio of length to cross section.

18. A denture as set forth in claim 10 in which said artificial teeth are formed from composite material where the sides are relatively soft and the biting surfaces are relatively hard.

19. A denture as set forth in claim 10 in which the side portions of the artificial teeth are formed from plastic material and the biting surfaces are formed from procelain.

20. An artificial tooth structure which includes a body structure having a recess formed in one side thereof to provide a tooth of substantially L-shaped section and permanent magnet material of substantially rectangular cross-section set in to the said tooth substantially filling the said recess therein.

21. A denture comprising a plurality of artificial teeth, each apertured in a direction generally parallel to the biting surface, supporting means for said teeth, a permanent magnet traversing said apertures, said permanent magnet comprising a plurality of bars in end-to-end contact with one another.

References Cited in the file of this patent

UNITED STATES PATENTS

| | | |
|---|---|---|
| 2,149,048 | Freedman | Feb. 28, 1939 |
| 2,391,925 | Saffir | Jan. 1, 1946 |
| 2,555,392 | Bierbach et al. | June 5, 1951 |
| 2,555,403 | Freedman | June 5, 1951 |